(12) United States Patent
Reeves et al.

(10) Patent No.: US 8,883,070 B2
(45) Date of Patent: Nov. 11, 2014

(54) MOLTEN METAL CONTAINMENT STRUCTURE HAVING FLOW THROUGH VENTILATION

(75) Inventors: Eric W. Reeves, Hayden Lake, ID (US);
Jason D. Hymas, Fairfield, WA (US);
John Steven Tingey, Rathdrum, ID (US)

(73) Assignee: Novelis Inc., Atlanta, GA (US)

( * ) Notice: Subject to any disclaimer, the term of this patent is extended or adjusted under 35 U.S.C. 154(b) by 174 days.

(21) Appl. No.: 12/928,354

(22) Filed: Dec. 8, 2010

(65) Prior Publication Data
US 2011/0140318 A1 Jun. 16, 2011

Related U.S. Application Data

(60) Provisional application No. 61/283,887, filed on Dec. 10, 2009.

(51) Int. Cl.
| | | |
|---|---|---|
| *C21B 7/04* | (2006.01) | |
| *C21B 7/16* | (2006.01) | |
| *C21B 7/14* | (2006.01) | |
| *B22D 11/103* | (2006.01) | |
| *F27D 3/14* | (2006.01) | |
| *C21C 5/52* | (2006.01) | |
| *B22D 35/04* | (2006.01) | |

(52) U.S. Cl.
CPC .............. *C21B 7/14* (2013.01); *B22D 11/103* (2013.01); *F27D 3/14* (2013.01); *C21C 5/5294* (2013.01); *B22D 35/04* (2013.01)
USPC ............................ 266/215; 266/265; 266/280

(58) Field of Classification Search
CPC ........ B22D 11/103; B22D 35/04; F27D 3/14; C21C 5/5294; C21B 7/14
USPC ........... 266/46, 191, 196, 215, 265, 280, 275, 266/285, 286; 164/455, 155.1, 335, 437; 222/591; 432/264, 262, 261, 263
See application file for complete search history.

(56) References Cited

U.S. PATENT DOCUMENTS 3,352,665 A * 11/1967 Hanas et al. ................. 75/10.16
4,531,717 A    7/1985 Hebrant
(Continued)

FOREIGN PATENT DOCUMENTS

CN    1048235    1/1991
CN    1894061    1/2007
(Continued)

OTHER PUBLICATIONS

U.S. Appl. No. 12/928,355, filed Dec. 8, 2010, Reeves et al.
(Continued)

*Primary Examiner* — Scott Kastler
*Assistant Examiner* — Michael Aboagye
(74) *Attorney, Agent, or Firm* — Kilpatrick Townsend & Stockton LLP

(57) ABSTRACT

Exemplary embodiments of the invention provide a molten metal containment structure including a refractory molten metal containment vessel having an external surface, and a metal casing for the vessel having an internal surface at least partially surrounding the external surface of the vessel at a distance therefrom forming a spacing between the vessel and the casing. The spacing includes an unobstructed upwardly extending gap that is vented to the exterior of the structure by upper and lower openings in the casing. A layer of insulating material is preferably positioned in the spacing between the internal surface of the casing and the external surface of the vessel, with the layer of insulating material being narrower than the spacing at least at upwardly extending sides of the casing, thereby forming the unobstructed gap. The vessel may be a metal conveying trough, a housing for a metal filter, a container for a metal degasser unit, a crucible, or the like.

15 Claims, 3 Drawing Sheets

(56) References Cited

U.S. PATENT DOCUMENTS

| | | | |
|---|---|---|---|
| 5,031,882 A | | 7/1991 | Van Laar et al. |
| 5,129,631 A | | 7/1992 | Van Laar |
| 5,139,239 A | * | 8/1992 | Eccleston .................. 266/275 |
| 5,316,071 A | | 5/1994 | Skinner et al. |
| 5,360,200 A | * | 11/1994 | Kloth et al. .................. 266/44 |
| 5,673,902 A | | 10/1997 | Aubrey et al. |
| 6,123,894 A | | 9/2000 | Van Laar et al. |
| 6,973,955 B2 | * | 12/2005 | Tingey et al. .............. 164/133 |

FOREIGN PATENT DOCUMENTS

| | | |
|---|---|---|
| GB | 494708 | 10/1938 |
| GB | 733272 | 4/1957 |
| GB | 781233 | 8/1957 |
| GB | 2119490 A | 11/1983 |
| JP | S4619773 Y1 | 7/1971 |
| JP | S50110556 U | 9/1975 |
| JP | S5159532 U | 5/1976 |
| JP | S5224010 U | 2/1977 |
| JP | S52151105 U | 11/1977 |
| JP | 4 236 093 A | 8/1992 |
| WO | WO 95/21273 A1 | 8/1995 |
| WO | WO 2006/110974 A1 | 10/2006 |

OTHER PUBLICATIONS

Canadian Intellectual Property Office, International Search Report, Feb. 18, 2011, PCT/CA2010/001936 (Novelis Inc., et al.).

Patent Abstracts of Japan, JP4236093A, "Heating Furnace", Aug. 25, 1992, F27D1/12, Watanabe Toru.

Japanese Patent Application No. 2012-542321, Office Action mailed Apr. 15, 2014, 3 pages.

Canadian Patent Application No. 2,778,433, Notice of Allowance mailed Mar. 14, 2014, 1 page.

European Patent Application No. 10835334.3, Extended European Search Report mailed Dec. 9, 2013, 6 pages.

Chinese Patent Application No. CN201080055925.6, First Office Action and Search Report issued Mar. 20, 2014, 20 pages.

* cited by examiner

MOLTEN METAL CONTAINMENT STRUCTURE HAVING FLOW THROUGH VENTILATION

CROSS-REFERENCE TO RELATED APPLICATION

This application claims the priority right of provisional U.S. patent application Ser. No. 61/283,887 filed on Dec. 10, 2009 by applicants herein. The entire contents of application Ser. No. 61/283,887 are specifically incorporated herein for all purposes by this reference.

BACKGROUND OF THE INVENTION (1) Field of the Invention

The present invention relates to molten metal containment systems and structures used, for example, for conveying molten metal from one location to is another, e.g. from a metal melting furnace to a metal casting mold or casting table. More particularly, the invention relates to such structures containing a refractory (usually ceramic) vessel, e.g. a metal distribution trough, crucible, or the like, contained within an outer metal casing used to support, protect and locate the refractory vessel.

(2) Description of the Related Art

Metal containment structures of this kind suffer from the disadvantage that the refractory vessel may become extremely hot during use due to contact with the molten metal (e.g. 680° C. to 750° C. when conveying molten aluminum or aluminum alloys). If this heat is transferred to the outer metal casing of the structure, the metal casing may be subjected to expansion, warping or distortion which, in turn, may cause cracks to form in the vessel or, if the refractory vessel is made in sections, may cause gaps to form between the sections, thereby allowing molten metal to leak from the vessel into the casing. Additionally, the outer surfaces of the casing may assume an operating temperature that is unsafe for operators of the equipment. These disadvantages are made worse if additional heating is applied to the exterior of the vessel within the casing to maintain the molten metal at a desired high temperature. For example, temperatures of up to 900° C. may be reached on the outside of the vessel when further heating of this kind is employed. Layers of insulating material may be provided between the vessel and the interior of the casing, but such layers may not be sufficient to maintain an acceptable temperature at the outer surface of the casing without unduly increasing the width of the walls of the metal containment structure.

It may also be possible to form an air gap within the casing to provide further thermal isolation from the vessel. For example, U.S. Pat. No. 5,316,071, which issued to Skinner et al. on May 31, 1994, discloses a molten metal distribution launder having an air gap or air gaps between layers of insulation and an outer metal casing or shell. A blower is employed to move air longitudinally along the side wall cavities to cool the support structure. However, the provision of such an arrangement of blowers is complex and expensive, and therefore undesirable.

There is, accordingly, a need for improved means of providing support for a refractory metal containment vessel, such as a trough, within a metal casing of a metal containment structure while avoiding unduly elevated temperatures at the outer casing surfaces.

BRIEF SUMMARY OF THE EXEMPLARY EMBODIMENTS

An exemplary embodiment of the invention provides a molten metal containment (e.g. holding or distribution) structure including a refractory molten metal containment vessel having an external surface, and a metal casing for the vessel having an internal surface at least partially surrounding the external surface of the vessel at a distance therefrom forming a spacing between the vessel and the casing. The spacing includes an unobstructed upwardly extending gap that is vented to the exterior of the structure by upper and lower openings in the casing. Preferably, a layer of insulating material is positioned in the spacing between the internal surface of the casing and the external surface of the vessel, the layer of insulating material being narrower than the spacing at least at upwardly extending sides of the casing, thereby forming the unobstructed gap.

The unobstructed gap is preferably formed between the layer of insulating material and the internal surface of the metal casing, but may alternatively, or additionally, be formed between the layer of insulating material and the external surface of the refractory vessel. Additionally, a second gap (vented or unvented) may be formed on a side of the layer of insulation material opposite to the unobstructed gap.

The unobstructed gap may, if desired, be made to extend across the bottom of the metal casing as well as at the upwardly extending sides.

The casing preferably has a bottom wall, side walls and a top, with the upper and lower openings being positioned in or adjacent to the top and the bottom wall of the casing. Preferably, the lower openings are channels formed between plates used for the bottom wall and side walls of the casing, and the upper openings are holes or slots in the upper wall of the casing.

Most preferably, the unobstructed gap and the openings are dimensioned to cause laminar flow of air through the gap.

The vessel may be, for example, an elongated molten metal conveying trough having an elongated channel extending from one longitudinal end of the trough to an opposite longitudinal end, a vessel with a channel for conveying molten metal, the channel being provided with a metal filter, a vessel having an interior volume for containing molten metal with at least one metal degassing impeller extending into the interior volume, or a crucible having an interior volume adapted for containing molten metal.

A preferred embodiment provides a molten metal distribution structure having a ceramic trough having sides and a bottom, and an external surface, and a metal casing for the ceramic trough having an internal surface at least partially surrounding the external surface of the ceramic trough at a distance therefrom forming a spacing between the trough and the casing. A layer of thermal insulation material is positioned in the spacing between the ceramic trough and the casing. The layer of insulation material adjacent to the sides of the ceramic trough is made narrower than the spacing at these points to form an upwardly-extending continuous unfilled gap within the structure at the sides thereof. The gap communicates with lower and upper openings in the casing positioned to permit external air to enter and flow upwardly through the gap. The gap creates and air flow through the casing that reduces the temperature of the casing.

The vessel of all exemplary embodiments is primarily intended for containing or conveying molten aluminium or aluminium alloys, but may be applied for containing or conveying other molten metals and alloys, particularly those having melting points similar to molten aluminium, e.g. magnesium, lead, tin and zinc (which have melting points lower melting points than aluminium) and copper and gold (which have higher melting points). Iron and steel have much higher melting points, but the structures of the invention may also be designed for such metals, if desired. Molten aluminum held in an unheated vessel is typically kept at a temperature in the range of 680 to 720° C. Under such conditions, the temperature of the outer surface of an insulating layer would normally be around 250 to 300° C., and the exemplary embodiments may reduce the temperature of the external metal casing to 100° C. or less.

The vessel is preferably made of a refractory material. The term "refractory material" as used herein to refer to metal containment vessels is intended to include all materials that are relatively resistant to attack by molten metals and that are capable of retaining their strength at the high temperatures contemplated for the vessels. Such materials include, but are not limited to, ceramic materials (inorganic non-metallic solids and heat-resistant glasses) and non-metals. A non-limiting list of suitable materials includes the following: the oxides of aluminum (alumina), silicon (silica, particularly fused silica), magnesium (magnesia), calcium (lime), zirconium (zirconia), boron (boron oxide); metal carbides, borides, nitrides, silicides, such as silicon carbide, nitride-bonded silicon carbide (SiC/Si3N4), boron carbide, boron nitride; aluminosilicates, e.g. calcium aluminum silicate; composite materials (e.g. composites of oxides and non-oxides); glasses, including machinable glasses; mineral wools of fibers or mixtures thereof; carbon or graphite; and the like.

The term "metal containment vessel" includes, without limitation, vessels that are intended and designed to hold molten metal for a period of time and vessels that are intended and designed to convey molten metal from one location to another either continuously or intermittently.

BRIEF DESCRIPTION OF THE DRAWINGS

Exemplary embodiments of the invention are described in the following with reference to the accompanying drawings, in which.

DETAILED DESCRIPTION OF THE EXEMPLARY EMBODIMENTS

Figure 1:
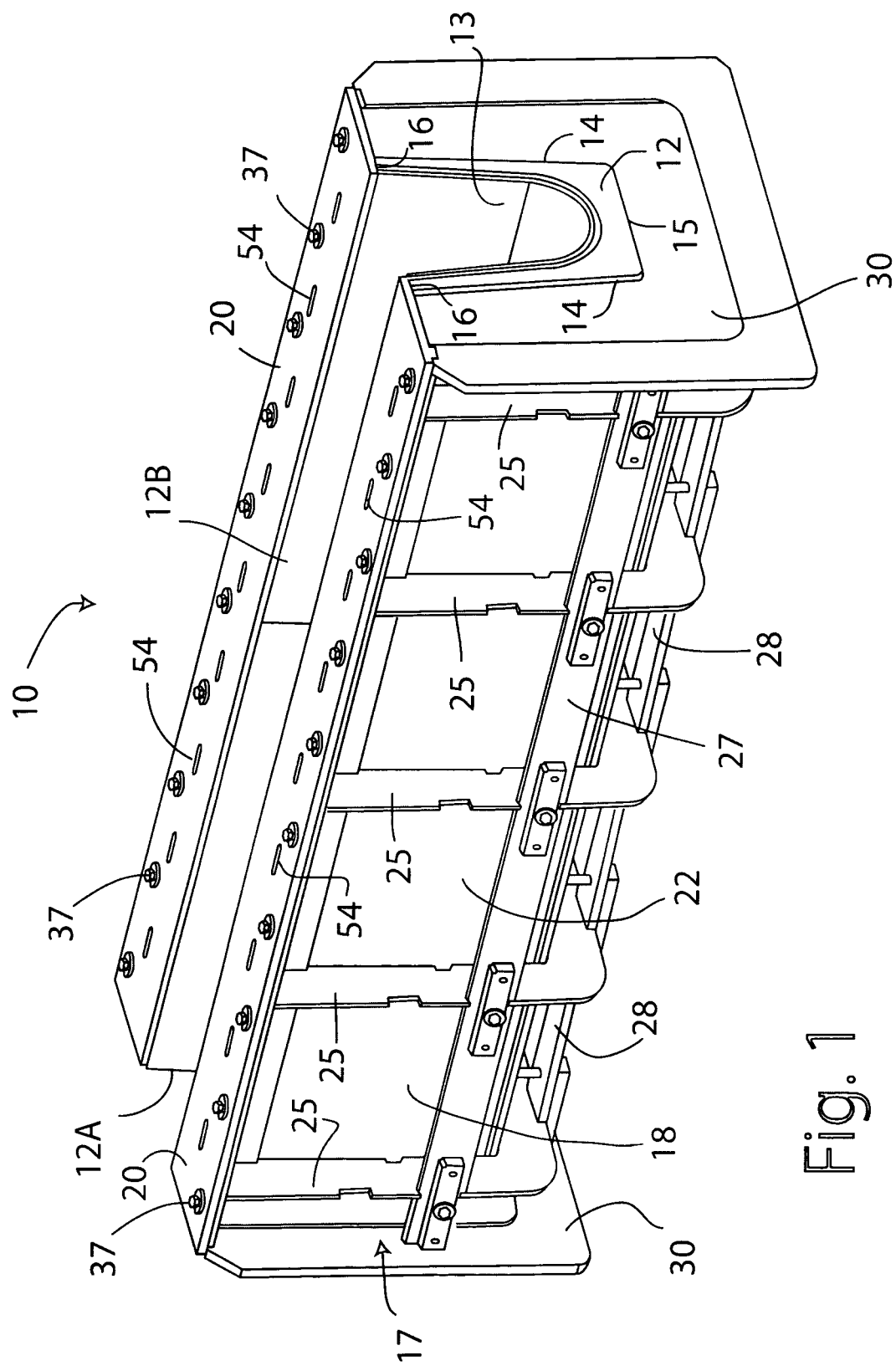
FIG. 1 of the accompanying drawings is a perspective view of a molten metal containment structure or launder according to one exemplary embodiment of the present invention.
Figure 2:
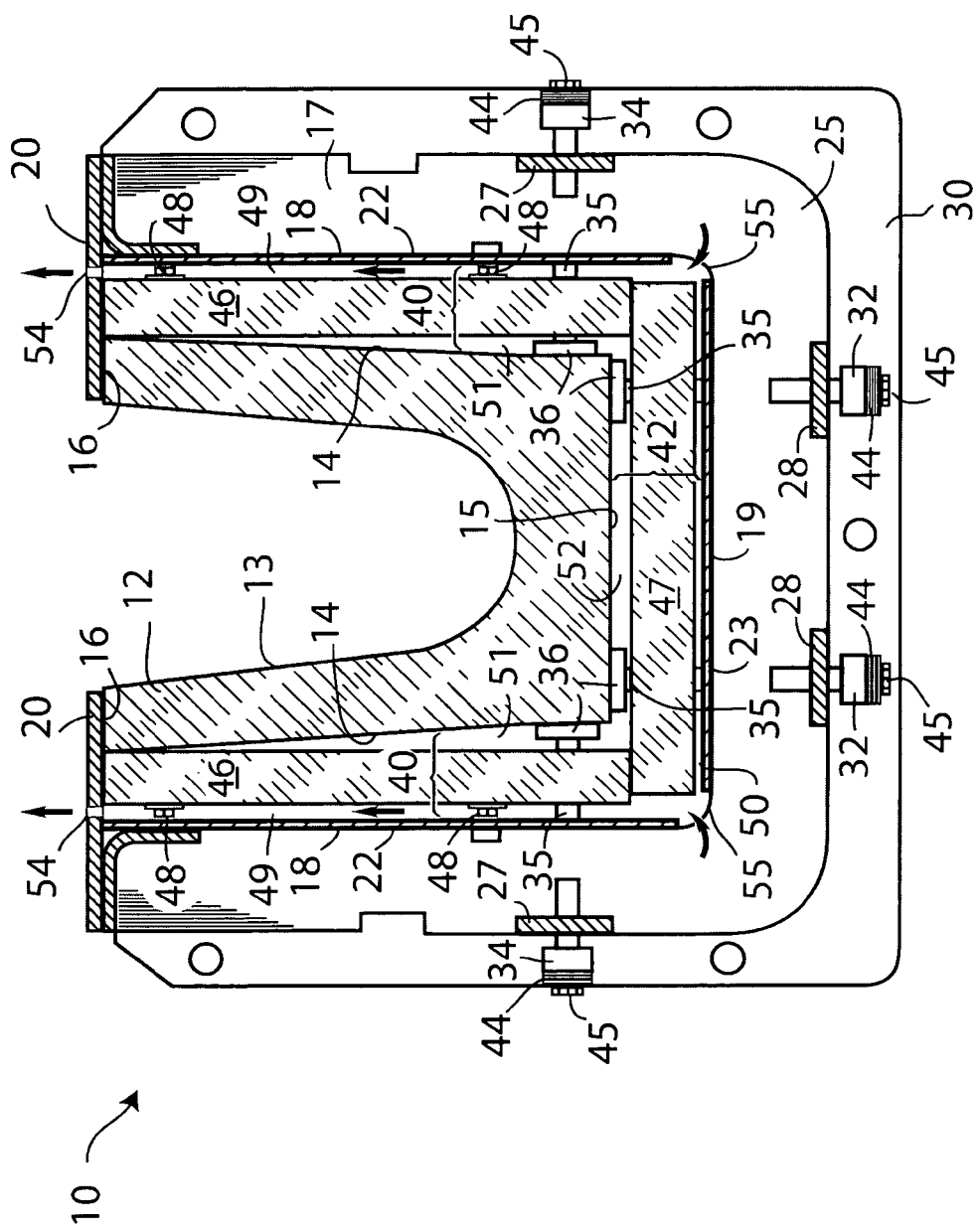
FIG. 2 is a transverse cross-section of the structure of FIG. 1.
Figure 3:
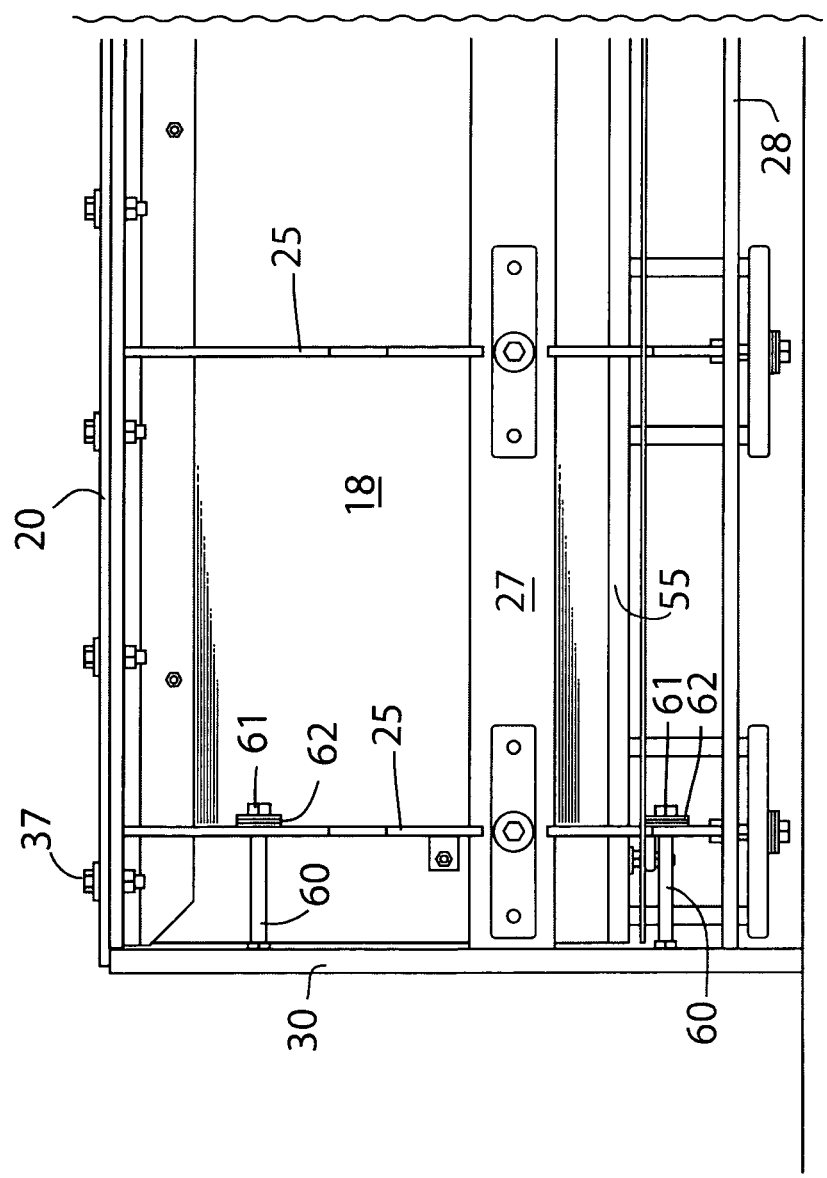
FIG. 3 is a side view of part of the structure of FIGS. 1 and 2.

FIGS. 1 to 3 illustrate a molten metal distribution structure 10 (e.g. a launder) according to one exemplary embodiment of the present invention. The structure has a refractory trough 12 acting as a metal containment vessel. The trough, which is made up of two trough sections 12A and 12B, may be made of any suitable ceramics material that is resistant to high temperature and to attack by the molten metal conveyed through the trough. Suitable examples include alumina and metal carbides, such as silicon carbide. The trough has a U-shaped channel 13 for conveying molten metal from one end of the structure to the other. In use, the structure would be connected at each end to other equipment, e.g. a launder from a metal melting furnace and a launder leading to a casting mould or casting table (not shown). The trough has longitudinal sides 14, a bottom 15 and narrow top edges 16 running along each side of the channel 13.

The trough 12 is positioned within, and partially surrounded by, a metal casing 17 which serves to position the trough, to keep the trough sections mutually aligned and in contact, and to protect the trough. The casing 17 has sides 18, a bottom 19 (see FIG. 2) and top plates 20 extending on each side of the U-shaped channel 13 of the trough. The casing 17 may be made from steel or other metal that exhibits good strength at elevated temperatures.

As illustrated, the casing of this exemplary embodiment is made of several parts. The sides and bottom of the casing are made from elongated metal plates 22 and 23, respectively. These plates are held together by means of numerous U-shaped metal ribs 25 spaced along the structure between the longitudinal ends thereof. In turn, the ribs 25 are held by metal side braces 27 and bottom braces 28 extending between the ribs and connected to the outer edges thereof. The casing also has end compression flanges 30 at each longitudinal end that keep the trough under longitudinal compression to minimize cracks.

The trough 12 is rigidly supported within the casing by means of vertical compression supports 32 and horizontal compression supports 34. These supports are in the form of metal rods 35, made for example of stainless steel, extending through the bottom braces 28 and the side braces 27 through holes in the plates 23 and 22, and the thermal insulation material 46 and 47 to contact the trough at the bottom 15 and lower ends of the sides 14. The inner ends of the rods 35 are provided with enlarged metal contact pads 36 that spread the load applied by the rods to the trough 12 to avoid damage to the trough. The vertical compression supports 32 not only support the trough but apply compressive force, which is possible because the top edges 16 of the trough are trapped beneath the top plates 20 of the casing that are held down firmly by bolts 37. The horizontal compression supports 34 also apply compressive force adjacent to the bottom of the trough, with supports being positioned opposite to each other to counterbalance the applied force. Thus, the compression supports suspend the trough within the casing while leaving spaces 40 and 42 separating the outer surfaces of the trough from the casing at the sides and bottom of the trough, respectively. The compressive supports accommodate any expansion and contraction of the trough, and of the casing, caused by thermal cycling, by virtue of compression washers 44 located below heads 45 of bolts passing through compression supports 32 and 34.

Positioned within the spaces 40 and 42 are layers 46 and 47 of thermal insulating material. These layers may be made of any suitable heat-resistant thermal insulation, e.g. boards made of refractory ceramics such as alumina. The layers 46 and 47 are narrower than the spaces 40 and 42, at least at the sides of the trough, and thus create unfilled continuous gaps 49 and 50 between the insulating layers and inner surfaces of the casing. These gaps are maintained by spacing bolts 48 which hold the layers of insulation away from the internal surface of the side plates 22. Gaps 51 and 52 are also formed between the insulating layers 46 and 47 and the external surface of the trough 12. However, the outer gaps 49 at the side of the casing are fully vented to the external atmosphere since they communicate with upper openings 54 and lower openings 55. The lower openings 55 are in fact open channels running the length of the structure formed between side plates 22 and bottom plate 23 of the casing since these plates are held in such a manner that their edges do not meet. The upper openings 54 are slots formed in the top plates 20, as best seen from FIG. 1. There are several such slots on each side of the trough arranged longitudinally along the top plates 20. As indicated by the arrows shown in FIG. 2, the upper and lower openings 54 and 55 allow external air to enter the gaps 49, to pass upwardly through the gaps due to convection caused by heating of the air, and to pass out of the gaps and the casing through the upper openings 54. The gaps and openings thus provide a passive form of cooling that removes heat from the is interior of the structure adjacent to the internal surface of the casing, and thus help to lower the temperature of the casing walls, thereby reducing the likelihood of warping, distortion and damage, and reducing the risk of burns to the operators.

The gap 50 at the bottom of the casing is also vented to the exterior by virtue of the communication of this gap with the side gaps 49, as shown. The bottom of the casing is thus also reduced in temperature due to this venting.

The width of the side gaps 49 and the size of openings 54 and 55 are preferably such that a relatively slow laminar flow of air passes through the gaps 49 without causing turbulence because turbulence may increase heat transfer across the gap. The optimum width of the gap is a function of the height of the trough, the surface characteristics of the insulating layers 46 and 47, and the design of the top plate 20, as well as the pressure, moisture content and temperature of the air, so the optimum width may vary according to such parameters. However, a gap of less than 0.06 inch (2 mm) is difficult to maintain over the length of the structure due to cutting and welding tolerances. On the other hand, as the gap is made wider, the width of the top plate 20 must increase, and this requires the plate to be made of a thicker gauge steel or the provision of supporting ribs to withstand the bending moment caused by the vertical compression of the refractory trough. For these reasons, a gap having a width greater than about 2 inches (5.1 cm), or even 1 inch (2.5 cm), may be problematic, and gaps wider than about 0.375 inch (1 cm), or even 0.25 inch (6 mm), may require extra structural support for the top plates. Generally, the openings 54 and 55 are made suitable in size and possibly shape to promote the smooth laminar flow of the air through the gaps, and indeed the upper openings 54 may be the most important for controlling the air flow. A suitable ratio of the opening size to that of the gap may be chosen by trial and experimentation or by computer modelling techniques.

The gaps 51 and 52 formed on the trough side of the insulation layers 46 and 47 are not vented to the exterior in the illustrated exemplary embodiment so they act as unvented thermal breaks or air gaps, but they may alternatively be vented through the provision of appropriate openings, e.g. small upper and lower openings in the insulating layers 46 and 47 providing communication with gaps 49 and 50, in order to produce further vented cooling of the structure. However, even if such additional venting is not provided, the gaps 51 and 52 provide additional thermal isolation of the trough from the casing.

FIG. 3 illustrates how the end compression flanges 30 may be placed under compression to act on the ends of trough 12. Thus, the flanges 30 are movable relative to the remainder of the casing and are attached to bolts 60 which pass through an adjacent rib 25. Rotation of bolt heads 61 draw the flange 20 axially inwardly and the flange in turn presses on the longitudinal end of the trough 12 (FIG. 2). Compression washers 62 positioned between the bolt head 61 and the rib 25 allow for slight movements of the trough due to contraction and expansion caused by thermal cycling.

Although the exemplary embodiment illustrated above is preferred, various modifications and alterations may be made, if desired. For example, insulating layers 46 and 47 may be entirely absent from the structure so that just the passive air ventilation is relied upon to protect the outer metal casing from exposure to high temperatures. Moreover, when such insulating layers are present, the vented gap may be provided on the vessel side of the insulating layers rather than on the casing side as shown, although this may have the effect of withdrawing large amounts of heat from the trough. The gap on the trough side of the insulation may be passively vented by providing holes or slots in the bottom layer 47 of insulation and in the side layers 46 of insulation near the top. The external air would then still enter through lower opening 55 and exit via upper opening 54, or the upper opening 54 could be moved to a position above the gap on the trough side of the insulation.

The structure of FIGS. 1 to 3 does not include heating means for the trough within the casing, but the use of such heating means is possible. For example, electrical heating elements may be provided in the gaps 51 at each side of the trough 12. Other examples of trough structures having heating means are disclosed in U.S. Pat. No. 6,973,955 which issued to Tingey et al. on Dec. 13, 2005 (the disclosure of which is specifically incorporated herein by this reference). If such heating means are employed, it is desirable to make the rods 35 of the vertical and horizontal compression supports partially or fully out of a refractory ceramic material, e.g. alumina, rather than out of metal. This is because the rods are subjected to higher temperatures when heating means are provided within the casing, and such temperatures may cause metal rods to deform or lose compressive strength. Suitable compression supports of the kind are disclosed in our co-pending U.S. patent application Ser. No. 12/928,355, filed concurrently herewith (which claims priority from U.S. provisional patent application Ser. No. 61/283,905 filed Dec. 10, 2009). The disclosure of this application is specifically incorporated herein by this reference.

In the above embodiment, the trough 12 is an elongated molten metal trough of the kind used in molten metal distribution systems used for conveying molten metal from one location (e.g. a metal melting furnace) to another location (e.g. a casting mold). However, according to other exemplary embodiments, other kinds of metal containment and distribution vessels may employed, e.g. as an in-line ceramic filter (e.g. a ceramic foam filter) used for filtering particulates out of a molten metal stream as it passes, for example, from a metal melting furnace to a casting table. In such a case, the vessel includes a channel for conveying molten metal with a filter positioned in the channel. Examples of such vessels and molten metal containment systems are disclosed in U.S. Pat. No. 5,673,902 which issued to Aubrey et al. on Oct. 7, 1997, and PCT publication no. WO 2006/110974 A1 published on Oct. 26, 2006. The disclosures of the aforesaid U.S. patent and PCT publication are specifically incorporated herein by this reference.

In another exemplary embodiment, the vessel acts as a container in which molten metal is degassed, e.g. as in a so-called "Alcan compact metal degasser" as disclosed in PCT patent publication WO 95/21273 published on Aug. 10, 1995 (the disclosure of which is incorporated herein by reference). The degassing operation removes hydrogen and other impurities from a molten metal stream as it travels from a furnace to a casting table. Such a vessel includes an internal volume for molten metal containment into which rotatable degasser impellers project from above. The vessel may be used for batch processing, or it may be part of a metal distribution system attached to metal conveying vessels. In general, the vessel may be any refractory metal containment vessel positioned within a metal casing. The vessel may also be designed as a refractory ceramic crucible for containing large bodies of molten metal for transport from one location to another. All such alternative embodiments have a refractory vessel positioned within an outer metal casing and may thus be modified to incorporate the inventive features disclosed herein.

The invention claimed is:

1. A molten metal containment structure comprising:
a refractory molten metal containment vessel having an external surface; and
a metal casing for the vessel, the casing having a bottom wall, side walls, a top, and an internal surface at least partially surrounding the external surface of the vessel at a distance therefrom forming a spacing between the vessel and the casing;
wherein the spacing includes an unobstructed upwardly extending gap and wherein said causing has upper openings formed in or adjacent to the top of casing and openings formed in or adjacent to the bottom wall of the casing, wherein said gap communicates with the upper and lower openings for venting said gap to the external atmosphere such that, when the vessel external surface is heated by molten metal contained within the vessel, external air entering said gap through the lower openings passes upwardly through the upper owing to convention caused by heating of the air and passes out of said gap through the upper openings thereby to provide passive cooling that removes heat from the interior of the structure adjacent to the internal surface of the casing; and
wherein the metal casing comprises separate metal plates forming the side walls and the bottom wall of the causing, wherein the plates are positioned to create channels between the bottom wall and each of the walls and wherein the channels form the lower openings.

2. The structure of claim 1, wherein a layer of insulating material is positioned in the spacing between the internal surface of the casing and the external surface of the vessel, said layer of insulating material being narrower than the spacing at least at upwardly extending sides of the casing, thereby forming said unobstructed gap in the spacing.

3. The structure of claim 2, wherein the unobstructed gap is formed between said layer of insulating material and the internal surface of the metal casing.

4. The structure of claim 2, wherein the unobstructed gap is formed between said layer of insulating material and the external surface of the refractory vessel.

5. The structure of claim 2, wherein said unobstructed gap is formed on one side of the layer of insulation material, and a second unobstructed gap is formed on another side of the layer of insulation material.

6. The structure of claim 5, wherein the second unobstructed gap communicates with the lower and upper openings in the casing positioned to permit external air to enter and flow upwardly through the second unobstructed gap.

7. The structure of claim 1, wherein the casing has a bottom wall, side walls and a top, and wherein said upper and lower openings in the casing are formed in or adjacent to the top and the bottom wall of the casing.

8. The structure of claim 7, wherein said top of the casing has slots therein, said slots forming said upper openings.

9. The structure of claim 1, wherein the vessel is made of a ceramic material.

10. The structure of claim 1, wherein said refractory vessel is an elongated molten metal conveying trough having an elongated channel extending from one longitudinal end of the trough to an opposite longitudinal end.

11. The structure of claim 1, wherein the vessel has a channel for conveying molten metal, said channel containing a metal filter.

12. The structure of claim 1, wherein the vessel has an interior volume for containing molten metal, and at least one metal degassing impeller extending into the interior volume.

13. The structure of claim 1, wherein the vessel is a crucible having an interior volume adapted for containing molten metal.

14. A molten metal containment structure comprising:
a refractory molten metal containment vessel having an external surface; and
a metal casing for the vessel having an internal surface at least partially surrounding the external surface of the vessel at a distance therefrom forming a spacing between the vessel and the casing;
wherein the spacing includes an unobstructed upwardly extending gap that is vented to the exterior of the structure by upper and lower openings in the casing,
wherein a layer of insulating material is positioned in the spacing between the internal surface of the casing and the external surface of the vessel, said layer of insulating material being narrower than the spacing at least at upwardly extending sides of the casing, thereby forming said unobstructed gap in the spacing, and
wherein said layer of insulation material adjacent to a bottom of the casing is narrower than the spacing, said unobstructed gap thereby extending across said bottom of the casing as well as at said upward extending sides of the casing.

15. A molten metal containment structure comprising:
a refractory molten metal containment vessel having an external surface; and
a metal casing for the vessel having an internal surface at least partially surrounding the external surface of the vessel at a distance therefrom forming a spacing between the vessel and the casing;
wherein the spacing includes an unobstructed upwardly extending gap that is vented to the exterior of the structure by upper and lower openings in the casing,
wherein the casing has a bottom wall, side walls and a top, and wherein said upper and lower openings in the casing are formed in or adjacent to the top and the bottom wall of the casing, and
wherein the metal casing comprises separate metal plates forming the sides and bottom of the casing, said plates being positioned to create channels between said bottom wall and each of said side walls, said channels forming said lower openings.

* * * * *

UNITED STATES PATENT AND TRADEMARK OFFICE
CERTIFICATE OF CORRECTION

PATENT NO. : 8,883,070 B2
APPLICATION NO. : 12/928354
DATED : November 11, 2014
INVENTOR(S) : Eric W. Reeves, Jason D. Hymas and John Steven Tingey It is certified that error appears in the above-identified patent and that said Letters Patent is hereby corrected as shown below:

In the Claims

In Column 7, Claim 1, line 11, "causing" should be changed to --casing--.

In Column 7, Claim 1, lines 12-13, delete "top of casing and openings formed" and replace with --top of the casing and lower openings formed--.

In Column 7, Claim 1, line 19, delete "through the upper owing to convention" and replace with --through the gap owing to convection--.

In Column 7, Claim 1, lines 24-25, delete "the bottom wall of the causing," and replace with --the bottom wall of the casing,--.

In Column 7, Claim 1, line 27, delete "each of the walls" and replace with --each of the side walls--.

Signed and Sealed this
Fifth Day of May, 2015

Michelle K. Lee
*Director of the United States Patent and Trademark Office*